United States Patent
Paden

(10) Patent No.: US 11,073,828 B2
(45) Date of Patent: Jul. 27, 2021

(54) COMPRESSION OF SEMANTIC INFORMATION FOR TASK AND MOTION PLANNING

(71) Applicant: Samsung Electronics Co., Ltd., Suwon-si (KR)

(72) Inventor: Brian A. Paden, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 201 days.

(21) Appl. No.: 15/997,609

(22) Filed: Jun. 4, 2018

(65) Prior Publication Data
US 2019/0179311 A1   Jun. 13, 2019

Related U.S. Application Data

(60) Provisional application No. 62/596,625, filed on Dec. 8, 2017.

(51) Int. Cl.
G05D 1/00   (2006.01)
G05D 1/02   (2020.01)
(Continued)

(52) U.S. Cl.
CPC .......... *G05D 1/0088* (2013.01); *G01C 21/00* (2013.01); *G01C 21/28* (2013.01); *G05D 1/0212* (2013.01); *G05D 1/0231* (2013.01); *G06T 7/20* (2013.01)

(58) Field of Classification Search
CPC .. G05D 1/0088; G05D 1/0212; G05D 1/0231; G01C 21/00; G01C 21/28; G06T 7/20
See application file for complete search history.

(56) References Cited

U.S. PATENT DOCUMENTS 3,613,086 A * 10/1971 Loizides ................. H03M 7/30
3,916,387 A * 10/1975 Woodrum .......... G06F 16/9027
(Continued)

FOREIGN PATENT DOCUMENTS

AU   2016256885 A1 * 11/2017   ............ G01C 21/00
AU   2016258102 A1 * 11/2017   ............ G05D 1/0088
(Continued)

*Primary Examiner* — Behrang Badii
*Assistant Examiner* — Jalal C Coduroglu
(74) *Attorney, Agent, or Firm* — F. Chau & Associates, LLC

(57) ABSTRACT

A computer-implemented method of motion planning and an autonomous agent that executes that method are presented. The method includes generating a first set of indices that represent a predicate in a continuous state space, accessing a library of candidate motions, wherein each of the candidate motions has a second set of indices that represent a trajectory in the continuous state space, compressing the first set of indices and the second set of indices to generate a first set of compressed indices and a second set of compressed indices, and determining whether there is an intersection between the first set of indices and the second set of indices. The compressing may be done by partitioning the state space into regions, each region being occupied by the same set of candidate motions. Alternatively, the compressing may be done by applying run-length-encoding to binary vectors generated using a locality preserving, space filling curve such as a Hilbert curve or Z-order curve.

19 Claims, 12 Drawing Sheets

(51) Int. Cl.
*G06T 7/20* (2017.01)
*G01C 21/00* (2006.01)
*G01C 21/28* (2006.01)

(56) References Cited

U.S. PATENT DOCUMENTS

| | | | | |
|---|---|---|---|---|
| 5,255,329 | A * | 10/1993 | Tanimizu | G06K 9/6202 |
| | | | | 348/128 |
| 5,781,906 | A * | 7/1998 | Aggarwal | G06F 16/2264 |
| 5,963,642 | A * | 10/1999 | Goldstein | G06F 21/6227 |
| | | | | 713/193 |
| 6,546,146 | B1 * | 4/2003 | Hollinger | G06T 9/008 |
| | | | | 375/240.03 |
| 6,963,837 | B1 * | 11/2005 | Finke | G10L 15/187 |
| | | | | 704/240 |
| 7,414,549 | B1 * | 8/2008 | Yang | H03M 7/30 |
| | | | | 341/50 |
| 7,920,749 | B1 * | 4/2011 | Donovan | H04N 19/105 |
| | | | | 382/233 |
| 7,978,921 | B1 * | 7/2011 | Donovan | H04N 19/98 |
| | | | | 382/233 |
| 7,983,498 | B1 * | 7/2011 | Donovan | H03M 7/40 |
| | | | | 375/240 |
| 8,032,495 | B2 * | 10/2011 | Millett | G06F 16/9027 |
| | | | | 707/681 |
| 8,078,394 | B2 * | 12/2011 | Wang | G06F 16/29 |
| | | | | 701/540 |
| 8,521,330 | B2 | 8/2013 | Park et al. | |
| 8,571,745 | B2 * | 10/2013 | Pack | G05D 1/0088 |
| | | | | 701/27 |
| 8,686,875 | B2 * | 4/2014 | Inoue | G01S 15/931 |
| | | | | 340/932.2 |
| 8,694,503 | B1 * | 4/2014 | Naga | G06F 16/128 |
| | | | | 707/736 |
| 8,825,207 | B2 * | 9/2014 | Kim | B25J 9/1664 |
| | | | | 700/245 |
| 8,958,817 | B1 * | 2/2015 | Murphy | H04W 4/02 |
| | | | | 455/456.1 |
| 8,990,017 | B2 * | 3/2015 | Schilling | G01C 21/3492 |
| | | | | 701/533 |
| 9,080,878 | B2 * | 7/2015 | Skinder | G08G 1/144 |
| 9,092,520 | B2 * | 7/2015 | Yang | G06K 9/00758 |
| 9,104,976 | B2 * | 8/2015 | Bonastre | G06N 7/005 |
| 9,145,138 | B2 * | 9/2015 | Kim | B60W 30/06 |
| 9,323,250 | B2 * | 4/2016 | Wang | B25J 11/009 |
| 9,327,403 | B2 * | 5/2016 | Pack | G05D 1/0274 |
| 9,445,003 | B1 * | 9/2016 | Lelescu | H04N 5/23232 |
| 9,481,368 | B2 * | 11/2016 | Tomozawa | B62D 15/0285 |
| 9,575,993 | B2 * | 2/2017 | Pfeifle | G06F 16/29 |
| 9,576,073 | B2 * | 2/2017 | Pajor | G06F 16/9024 |
| 9,715,495 | B1 * | 7/2017 | Tacchi | G06F 16/358 |
| 9,785,149 | B2 * | 10/2017 | Wang | G16H 40/67 |
| 9,792,910 | B2 * | 10/2017 | Vlietinck | G10L 15/144 |
| 9,841,289 | B2 * | 12/2017 | Schilling | G01C 21/3453 |
| 9,846,050 | B2 | 12/2017 | Myers et al. | |
| 9,944,317 | B2 * | 4/2018 | Lee | B62D 15/0265 |
| 10,133,275 | B1 * | 11/2018 | Kobilarov | G05D 1/0272 |
| 10,346,214 | B2 * | 7/2019 | Li | G06F 9/4887 |
| 10,377,309 | B2 * | 8/2019 | Lee | G06K 9/00825 |
| 10,436,885 | B2 * | 10/2019 | Wheeler | G05D 1/0248 |

| | | | | |
|---|---|---|---|---|
| 2003/0061189 | A1 * | 3/2003 | Baskins | G06F 16/9027 |
| 2003/0061227 | A1 * | 3/2003 | Baskins | G06F 16/9027 |
| 2003/0103637 | A1 * | 6/2003 | Huang | H04R 1/1075 |
| | | | | 381/309 |
| 2006/0036633 | A1 * | 2/2006 | Chong | G06F 16/367 |
| 2007/0292021 | A1 * | 12/2007 | Caruso | H04N 7/17318 |
| | | | | 382/166 |
| 2008/0086236 | A1 | 4/2008 | Saito et al. | |
| 2009/0046569 | A1 * | 2/2009 | Chen | H04L 5/0007 |
| | | | | 370/203 |
| 2009/0182464 | A1 | 7/2009 | Myeong et al. | |
| 2013/0194126 | A1 * | 8/2013 | Paoletti | G01S 13/931 |
| | | | | 342/55 |
| 2013/0325244 | A1 * | 12/2013 | Wang | G06T 11/00 |
| | | | | 701/26 |
| 2015/0032684 | A1 * | 1/2015 | Gupta | G06F 16/2228 |
| | | | | 707/600 |
| 2015/0156075 | A1 * | 6/2015 | Gist | H04L 41/22 |
| | | | | 709/201 |
| 2015/0168170 | A1 * | 6/2015 | Schilling | G01C 21/3446 |
| | | | | 701/418 |
| 2016/0075331 | A1 * | 3/2016 | Tomozawa | B60W 10/18 |
| | | | | 701/41 |
| 2016/0138924 | A1 | 5/2016 | An | |
| 2016/0362050 | A1 * | 12/2016 | Lee | G06K 9/00805 |
| 2016/0368489 | A1 * | 12/2016 | Aich | B60T 7/18 |
| 2017/0023944 | A1 * | 1/2017 | Wang | B25J 9/1689 |
| 2017/0043808 | A1 * | 2/2017 | Yang | G08G 1/143 |
| 2017/0052032 | A1 * | 2/2017 | Miksa | G01C 21/30 |
| 2017/0116280 | A1 * | 4/2017 | Shergill, Jr. | G06F 16/2343 |
| 2017/0129486 | A1 * | 5/2017 | Nakada | B60W 10/20 |
| 2017/0146999 | A1 * | 5/2017 | Cherepinsky | G05D 1/0214 |
| 2017/0166216 | A1 * | 6/2017 | Rander | G05D 1/0088 |
| 2017/0168485 | A1 * | 6/2017 | Berntorp | G05D 1/0217 |
| 2017/0168488 | A1 * | 6/2017 | Wierzynski | G05D 1/0231 |
| 2017/0213070 | A1 * | 7/2017 | Aghamohammadi | B25J 9/163 |
| 2018/0136308 | A1 * | 5/2018 | Wirola | H04L 69/04 |
| 2018/0232912 | A1 * | 8/2018 | Nevraev | G06T 1/60 |
| 2019/0172173 | A1 * | 6/2019 | Ceylan | G06T 15/005 |
| 2019/0179311 | A1 * | 6/2019 | Paden | G06T 7/20 |
| 2019/0359133 | A1 * | 11/2019 | Lee | B60R 1/00 |
| 2020/0160011 | A1 * | 5/2020 | Wagner | B07C 5/3412 |

FOREIGN PATENT DOCUMENTS

| | | | | |
|---|---|---|---|---|
| AU | 2016258172 A1 | * | 11/2017 | G05D 1/0261 |
| CA | 3050395 A1 | * | 11/2016 | G01C 21/00 |
| CA | 3050397 A1 | * | 11/2016 | G05D 1/0212 |
| CA | 3050407 A1 | * | 11/2016 | B66F 9/063 |
| CN | 106705951 A | * | 5/2017 | G05D 1/0088 |
| CN | 107291077 A | * | 10/2017 | G05D 1/027 |
| CN | 107430807 A | * | 12/2017 | B60W 30/12 |
| CN | 108417087 A | * | 8/2018 | G08G 1/096783 |
| CN | 105808209 B | * | 10/2018 | G06F 9/30149 |
| EP | 3056960 A1 | | 8/2016 | |
| JP | 5747191 B2 | | 5/2015 | |
| KR | 10-2013-0112507 A | | 10/2013 | |
| WO | WO-2016179478 A1 | * | 11/2016 | G05D 1/0261 |
| WO | WO-2016179482 A1 | * | 11/2016 | G01C 21/00 |
| WO | WO-2016179532 A1 | * | 11/2016 | G05D 1/0261 |
| WO | WO-2016179482 A4 | * | 12/2016 | G05D 1/0223 |
| WO | WO-2017177929 A1 | * | 10/2017 | G05D 1/0278 |

* cited by examiner

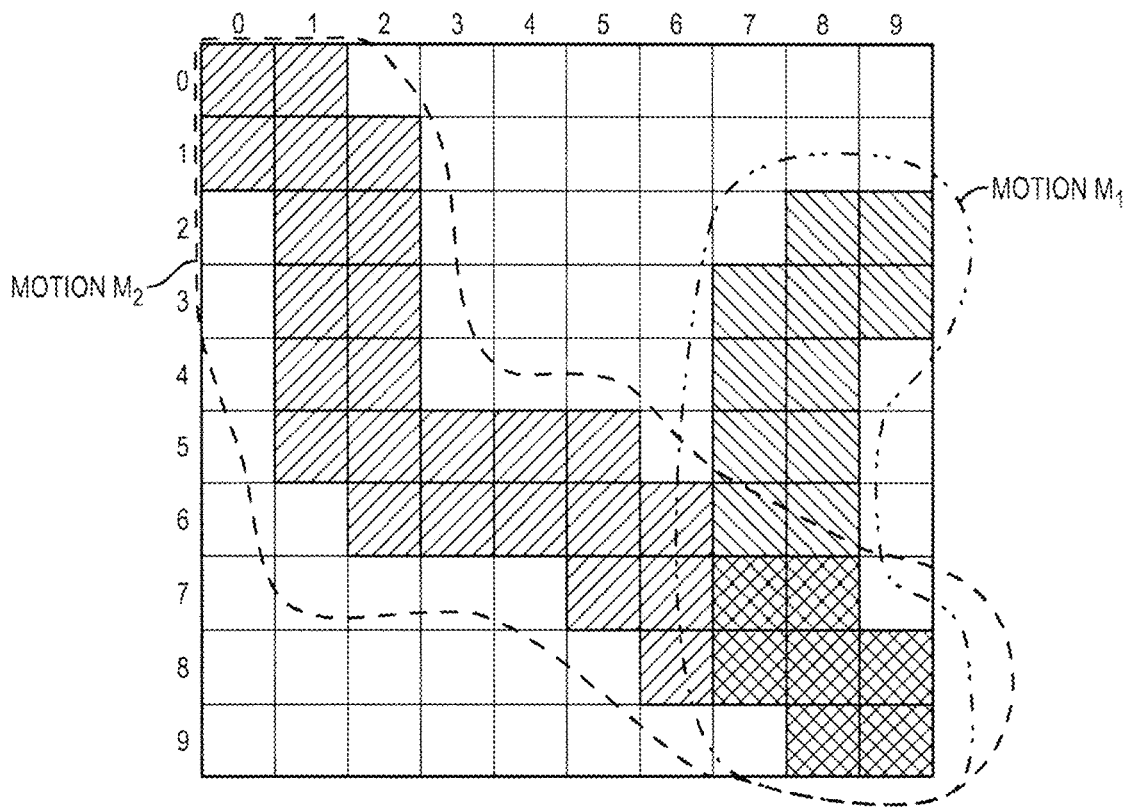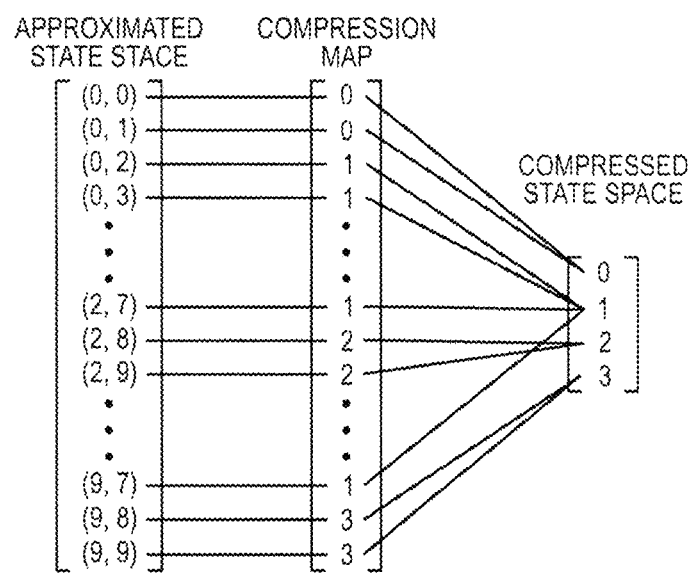
FIG. 6

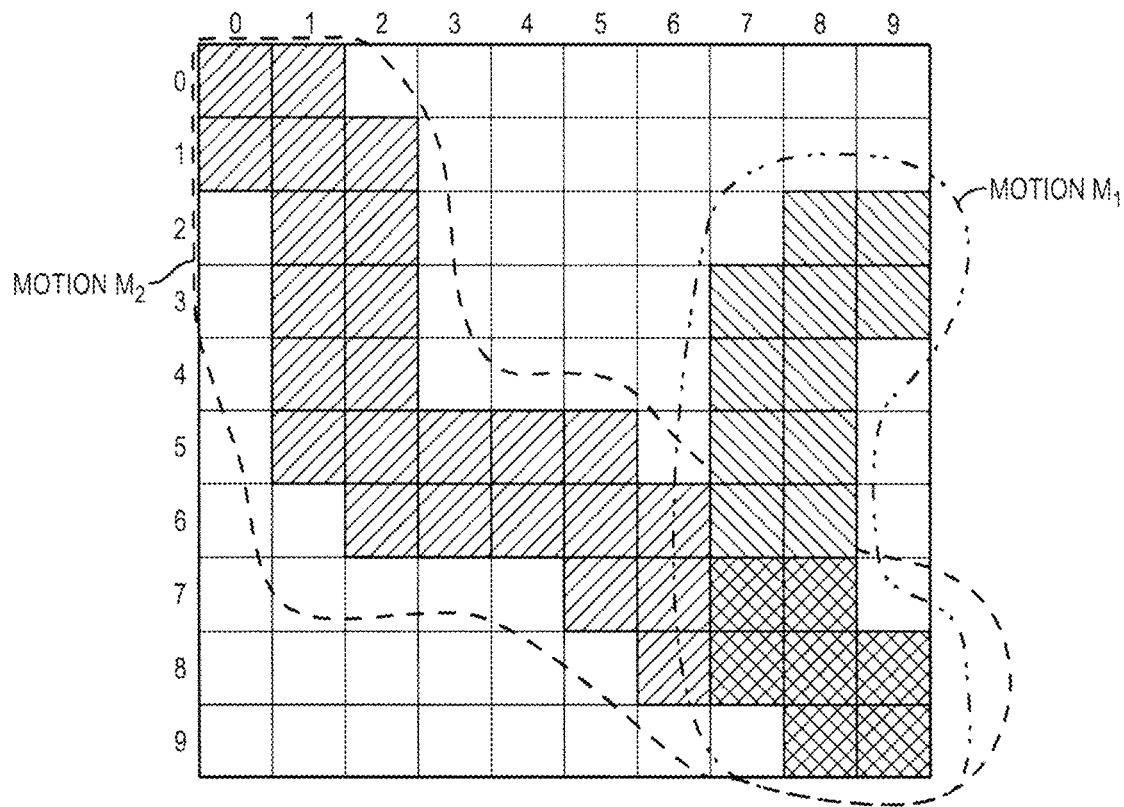
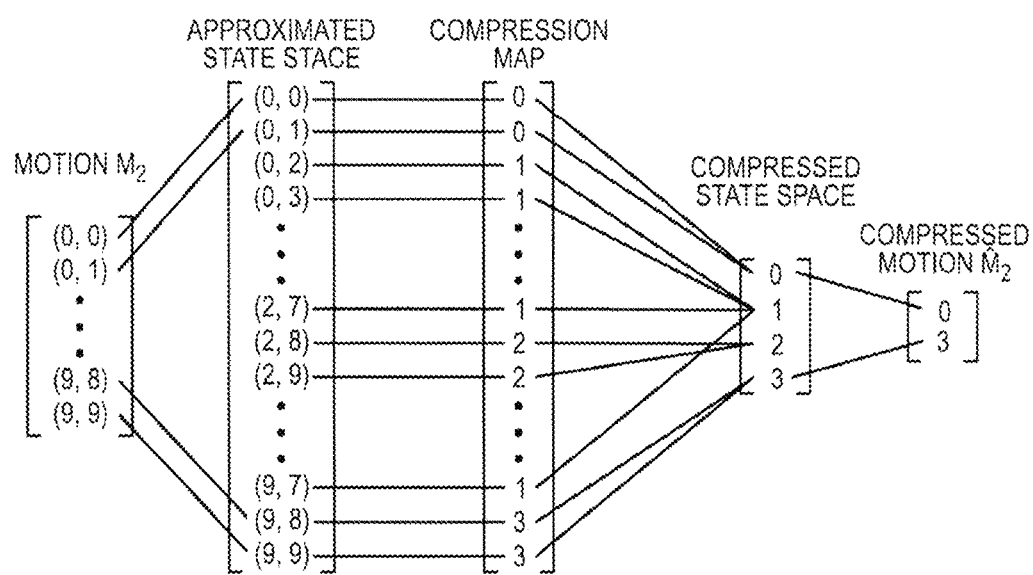
FIG. 7

Procedure 1: State space compression

```
1:  procedure COMPRESS(M, C)           ▷ Generate compression map C associated with M
2:      C ← ∅                          ▷ Initialize C to be empty
3:      p ← 0                          ▷ p will be an index in the compressed state space
4:      Q ← {1, 2, ..., n}             ▷ Initialize a queue with an index for each state
5:      while Q ≠ ∅ do
6:          p ← p + 1
7:          i ← min Q                  ▷ Assign i to the minimum index of Q
8:          Q ← Q \ {i}                ▷ Remove i from Q
9:          C_i ← p                    ▷ Associate i with a state in the reduced state space
10:         for j ∈ Q do               ▷ Check if each index j in Q can be merged with i
11:             m ← True
12:             for k ∈ M do           ▷ Indicates if i and j can be merged
13:                 if {i,j} ⊂ k or {i,j} ∩ k = ∅ then    ▷ Check condition in step 12 for every motion
14:                     continue
15:                 else               ▷ If True, i and j can be merged into a single state
16:                     m ← False
17:                     break          ▷ If False, no need to check remaining indices
18:                 end if
19:             end for
20:             if m == True then
21:                 C_j ← p            ▷ Associate j with p if m is True
22:                 Q ← Q \ {j}        ▷ Remove j from queue since it is assigned to the current value of p
23:             end if
24:         end for
25:     end while
26: end procedure
```

FIG. 9

200~# COMPRESSION OF SEMANTIC INFORMATION FOR TASK AND MOTION PLANNING

CROSS-REFERENCE TO RELATED APPLICATION(S)

This application claims the benefit of U.S. Provisional Application No. 62/596,625 filed on Dec. 8, 2017, which is incorporated by reference herein.

BACKGROUND

The inventive concept disclosed herein relates to a method and apparatus for motion and task planning in autonomous agents.

Today, much research is being done to enable autonomous agents such as unmanned aerial vehicles, self-driving cars, robots that move around to handle various tasks, etc. Reliably having autonomous agents move about on their own and take care of tasks will allow humans to be more productive and spend time doing things they enjoy. Autonomous agents offer multi-faceted advantages such as improved safety, reduced congestion, fuel efficiency, and greater mobility. To reap these benefits, however, the autonomous agents must be safe and reliable. Safety and reliability depend on solid planning methods that enable accurate real-time decision making. Decision making includes the general path/route selection as well as properly reacting to traffic conditions and obstacles encountered during travel.

Higher speed and fidelity decision-making offered by parallel computing helps accurate and timely decision making by autonomous agents. However, while traveling, e.g. on a public street, an autonomous agent often faces situations to which there are many possible ways to react. The possibilities have to be processed in a fraction second so a decision on a best course of action can be made. A scalable approach to making appropriate decisions is massively parallel evaluation of a large library of pre-computed motions. In this vein, a means of efficiently and accurately filtering through the large volume of pre-planned candidate motions is desired.

SUMMARY

In one aspect, the inventive concept pertains to a computer-implemented method of motion planning. The method entails generating a first set of indices that represent a predicate in a continuous state space, accessing a library of candidate motions, wherein each of the candidate motions has a second set of indices that represent a trajectory in the continuous state space, compressing the first and second set of indices to generate a first and second set of compressed indices, respectively, and determining whether there is an intersection between the first set of compressed indices and the second set of compressed indices.

In another aspect, the inventive concept pertains to an autonomous agent that has a perception system, a task and motion planning system, and a decision-making system. The perception system includes sensors that collect environmental data and a memory for storing map data. The task and motion planning system includes a processor for evaluating intersection between an environmental predicate and a candidate motion by segmenting a state space into cells, compressing the environmental predicate and the candidate motion by partitioning the state space into regions that are occupied by the same set of motions, and evaluating whether there is an intersection between the environmental predicate and the candidate motion. Each candidate motion is associated with one or more maneuvers executable by the autonomous agent. The decision-making system selects a candidate motion based on an output from the task and motion planning system.

In yet another aspect, the inventive concept pertains to an autonomous agent having a perception system, a task and motion planning system, and a decision-making system. The perception system includes sensors for collecting environmental data and a memory for storing map data. The task and motion planning system includes a memory for storing candidate motions and a processor for evaluating intersection between an environmental predicate and a candidate motion by segmenting a state space into cells, indexing the environmental predicate and the candidate motion by using a locality preserving, space filling curve such as a Hilbert curve or Z-order curve to generate a first binary vector representing the environmental predicate and a second binary vector representing the candidate motion, each candidate motion being associated with one or more maneuvers executable by the autonomous agent, and applying run-length encoding to the first and second binary vectors for compression to generate an output. The decision-making system selects a course of action based on the output.

BRIEF DESCRIPTION OF THE DRAWINGS

FIG. 6 illustrates how a compression map is generated by partitioning a state space in accordance with one embodiment.

FIG. 7 illustrates how the compression map of FIG. 6 is applied to a candidate motion to generate a compressed candidate motion, in accordance with one embodiment.

FIG. 9 is an example of how a state space can be partitioned by selectively merging cells, in accordance with one embodiment.

DETAILED DESCRIPTION

Figure 1:
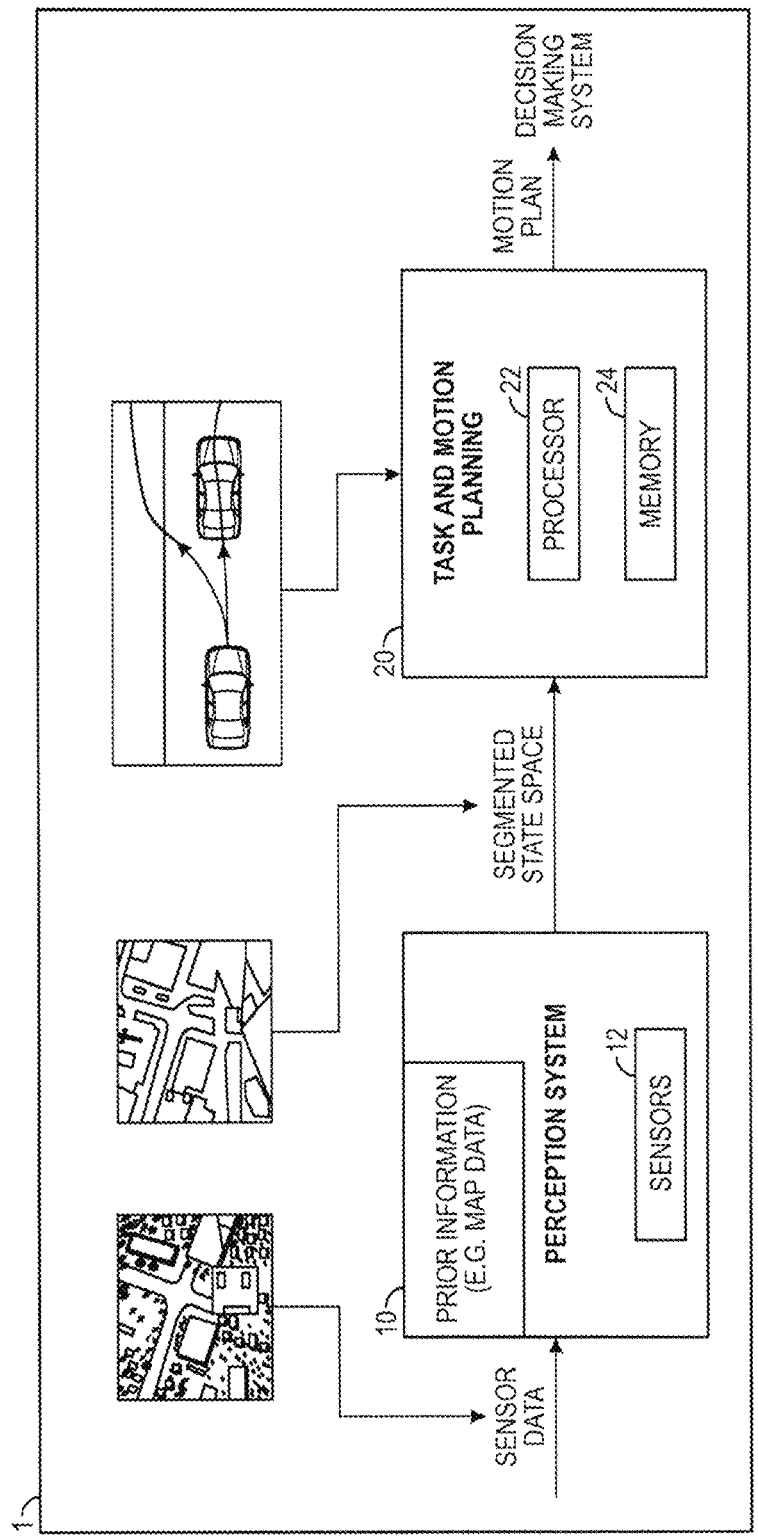
FIG. 1 is a depiction of an autonomous agent having a perception system and a task and motion planning system.

A method for efficiently evaluating the comfort, legality, and safety of a collection of motions in an autonomous driving/moving context is presented. The method generally entails defining a state space made of a finite number of cells, indexing the cells, and determining which possible motions taken intersects or does not intersect with an environmental predicate. Environmental predicates include various items in the environment such as pedestrians, sidewalk, lane markers, etc. A computational bottleneck in classic motion planning algorithms is collision checking candidate motions against relevant regions in the environment in real-time. The embodiments of task and motion planning method presented herein affords a principled construction of decision-making processes that may plan a motion to execute complex tasks. In one embodiment, the technique disclosed herein may be implemented as Application-Specific Integrated Circuit (ASIC).

Most systems construct their languages from a finite number of predicates relevant to the types of tasks the autonomous agent may execute. Each predicate in the language will take some logical value (true or false) for each of the potential states of the autonomous agent's environment. Thus, each predicate is associated with a subset of the state space and a collection of predicates induces a partition or segmentation of the state space where in each element of the partition, the logical value of each predicate is constant. Therefore, a finite number of features are selected to represent a sufficient summary of the environment to evaluate the logical value of each predicate. The finite dimensional vector space spanned by parameters is referred to as the "state space." Where the autonomous agent is an autonomous vehicle, states of the system may include features such as vehicle position, heading, and longitudinal velocity. As used herein, "driving" or "drive" refers to traveling or moving in a way that changes the agent's GPS coordinates.

Generally, the method disclosed herein entails receiving an area or volume in the autonomous agent's workspace associated with a logical predicate within the domain of discourse of the task planning specification. The area or volume is rasterized into a finite number of small areas or volumes, each of which is assigned an integer value so that the predicate is encoded as a set of integers. The swept area or volume by each precomputed motion is also encoded as a set of integers. Intersection of the logical predicate with each motion is determined by evaluating intersection of the sets of integers. The technique disclosed herein also includes a compression method applicable to the integer data, which allows intersection to be evaluated directly on the compressed format.

The method disclosed herein includes a compression map method and a run-length-encoding-based method. In both embodiments, there are two subsets of integers: 1) a subset of integers representing hyper-cubicle regions of a planning environment labeled with a particular predicate (e.g., pedestrian, dashed white line), and 2) subsets of integers corresponding to the volume swept out in the environment by each of a collection of motion primitives. The original index set is mapped to a smaller set that computes the same logical value of "intersects" or "does not intersect" between the environment predicate and each motion.

FIG. 1 depicts an autonomous agent 1 having a serial interconnection between a perception system 10 and a planning system 20. When reasoning about what motion to execute, the logical value of each predicate and motion are interpreted for evaluation. The perception system 10 extracts features from the environment or state space using data collected by its sensors 12 (e.g., camera and LIDAR measurements) in real time. The perception system 10 combines the sensor data with prior information (e.g., map data) that is stored in an accessible memory or storage. By doing so, the perception system 10 segments the defined state space.

The task and motion planning system 20 uses a library of candidate motions, each of which is associated with different possible actions that might be taken by the autonomous agent. The library of candidate motions may be stored in a memory 24. A motion may be simple (brake hard) or a combination of complex maneuvers. Each candidate motion has a trajectory that can be mapped onto the state space as a subset of the space. The task and motion planning system 20 intersects the subset of the state space swept out by each candidate motion with each of the semantically labeled predicate regions, via processor 22, ultimately labeling the candidate motion with predicate values. A decision-making system uses the outcomes of the task and motion planning system 20 to select a motion.

FIG. 1 illustrates the segmented state space in two dimensions for easy visualization. However, this is not a limitation of the disclosure and the state space can have any number of dimensions, large enough to evaluate logical value of the predicates in the specification language. The task and motion planning system 20 could be directly attached to a mechanism for motion (e.g., mechanical legs, wheels, wings, rotor, engine, etc.) or could be remote from the parts that do the traveling.

Figure 2:
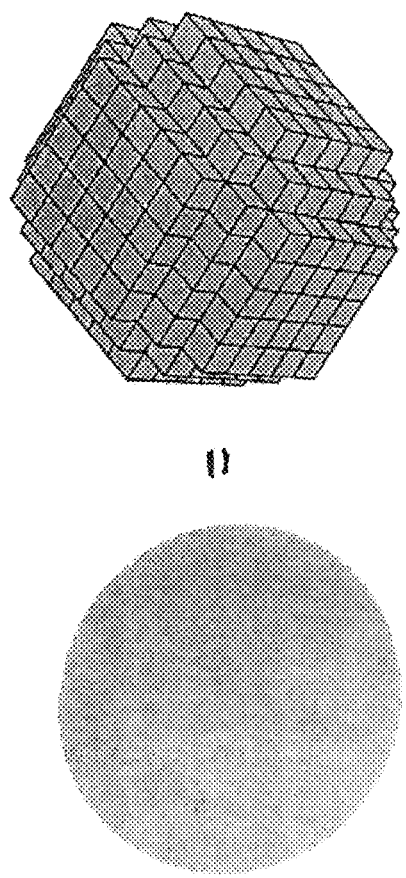
FIG. 2 depicts an approximation of a spherically-shaped state space by cubicle cells in a three-dimensional space.

FIG. 2 depicts an approximation of a spherically-shaped state space by cubicle cells in a three-dimensional space. The continuous state space is approximated by a grid of hyper-cubicle cells so that a subset of the state space is approximated by the cells that intersect that particular subset. By indexing the cubicle regions of the state space, each candidate motion and predicate can be represented by a collection of indices associated to the hyper-cubicle cells intersected by that object. A library of candidate motions may be precomputed offline and utilized for real-time planning. When planning in real-time, the partition of state space is frequently updated to reflect the new measurements made by the perception system 10. Thus, the calculation of intersections between environmental predicates and candidate motions may occur with sufficiently low latency for real-time use. In the worst case, the number of operations ops for relabeling the candidate motions with the updated logical values of predicates is given by the following equation:

$$ops = \frac{p*m*n}{2} \qquad \text{Equation 1}$$

where p is the number of predicates in the language, m is the number of candidate motions in the library, and n is the number of cells approximating the state space. Each of the m candidate motions is intersected with each of the p predicates, requiring p*m meta-operations. In the worst case for a single pair-wise comparison between a predicate and a motion, the motion occupies half of the indices of the state space, and the predicate occupies the other half. In this case, the index of the motion is examined for a total of n/2 operations, and index of the predicate is examined for a total of n/2 operations. In one embodiment, the index i of a candidate motion is checked for presence in a particular predicate. The process of checking the individual candidate motions against a particular predicate is computationally extensive and often uses a large amount of hardware (ASICs).

Generally, in task and motion planning, the agent's environment is represented as semantically-labeled state spaces with properties such as nominal lane, pedestrian, etc. Motions are stored in a similar manner, using index lists. Intersection is evaluated by intersecting index sets. To utilize this index-based intersection method, a set of primitive motions may be evaluated. As the set will be large, easily $10^6$ or more in the level 4 or 5 autonomous driving software stack, a compression may be utilized. The level of compression that can be achieved on this set of motions directly corresponds to a reduction in the number of operations required in a planning cycle. This can be leveraged to reduce the number of transistors required in an ASIC dedicated to this task.

The inventive concept utilizes a compressed representation for candidate motions and segmented regions that will reduce the number of online operations, thus reducing the burdens associated with extensive computation. As will be described below, an additional offline processing stage, as well as an additional online compression of perception data, may be useful for determining the compressed representation.

Figure 3:
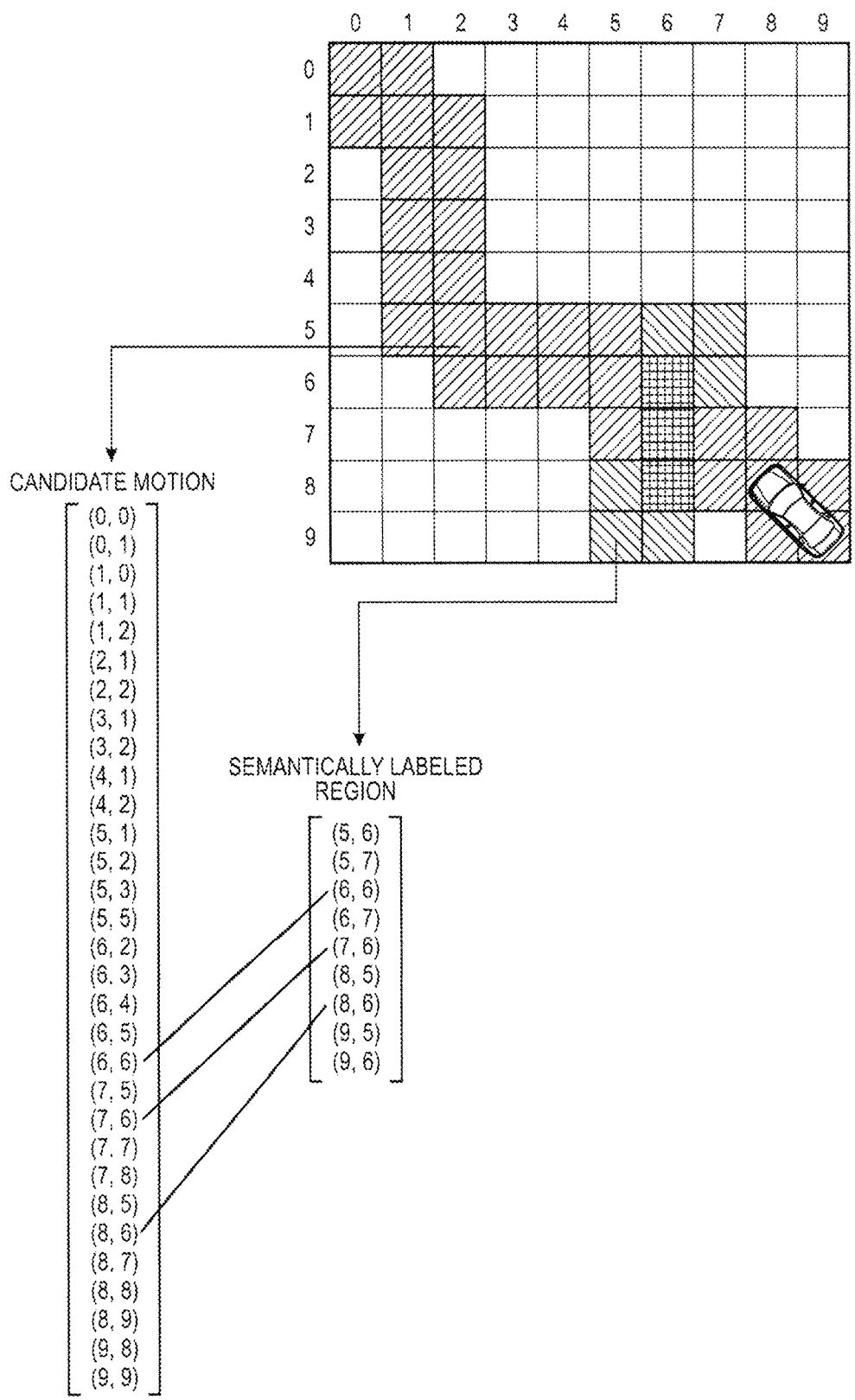
FIG. 3 illustrates an example of a semantically-labeled state space having 100 cells in accordance with one embodiment.

FIG. 3 illustrates an example of a semantically-labeled state space having 100 cells in accordance with one embodiment of the inventive concept. One candidate motion (marked by diagonal lines extending from upper right corner to bottom left corner of each square) is mapped onto the state space. A predicate, or a semantically-labeled region (indicated by diagonal lines extending from upper left corner to bottom right corner of each square) is also mapped onto the state space. The mapping identifies the cells that are occupied by both the candidate motion and the predicate as an intersection, in this case the intersection being (6,6) (7,6), and (8,6). The intersection is shown marked with a grid pattern in FIG. 3. The outcome of intersection evaluation for the particular motion would be "intersects."

Figure 4A:
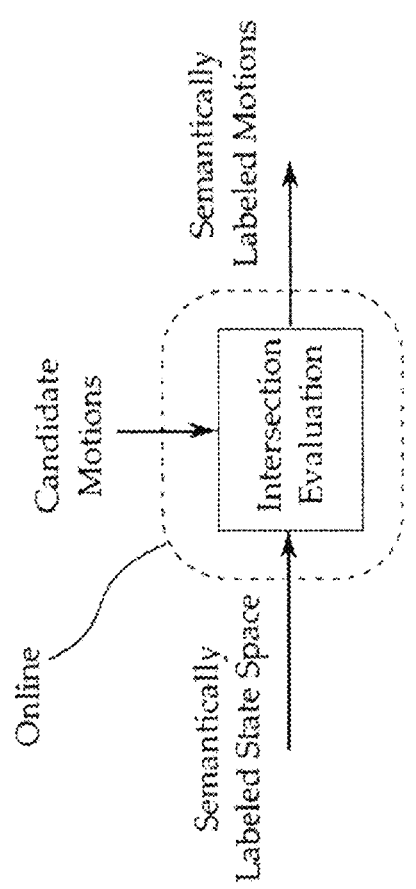
FIG. 4A depicts a block diagram representing the baseline approach for intersecting a collection of candidate motions with a semantically segmented state space.

FIG. 4A depicts a block diagram representing the baseline approach for intersecting a collection of candidate motions with a semantically segmented state space. The computations enclosed by the dashed box are carried out online. Hence, each of the candidate motions is compared with semantically labeled state space to generate semantically labeled motions, all in real-time. A semantically labeled motion is assigned a truth value for each logical predicate according to the result of the intersection evaluation of that motion with each logical predicate.

Figure 4B:
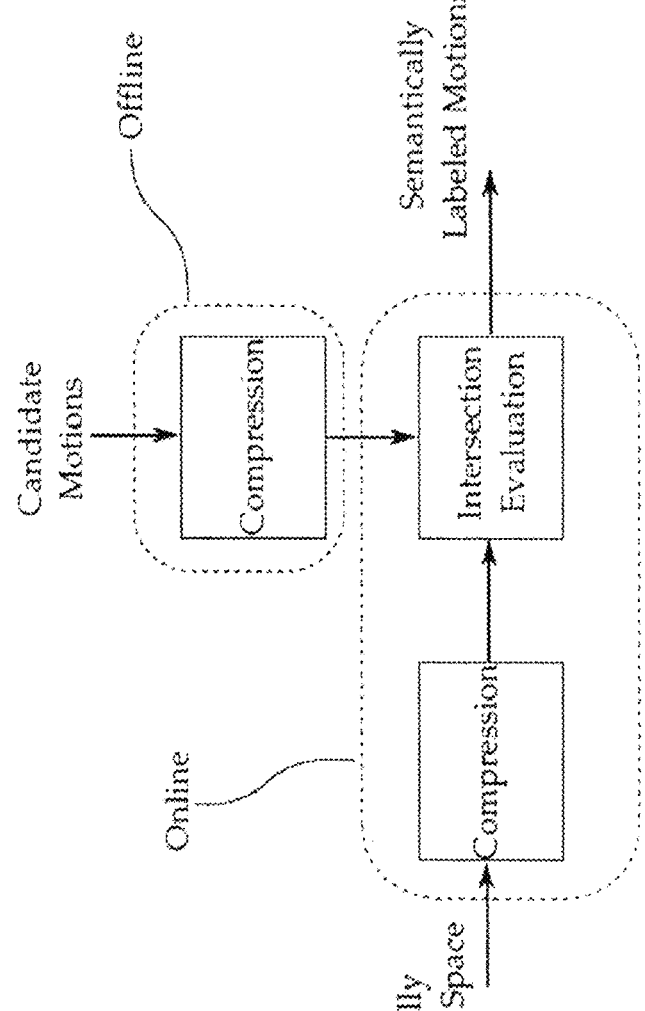
FIG. 4B depicts a block diagram showing the procedure in accordance with the inventive concept where semantically labeled regions of the state space are mapped to a compressed format and subjected to intersection evaluation in real time.

FIG. 4B depicts a block diagram showing the procedure in accordance with the inventive concept where semantically labeled regions of the state space are mapped to a compressed format and subjected to intersection evaluation in real time. The compression of the semantically labeled state space may reduce the number of operations used to evaluate intersections. The semantically-labeled state space may include environmental predicate data. In that case, the online compression of the predicate data will involve a small additional computation that will reduce the complexity of evaluating the intersection between the motion data and segmented regions. The library of candidate motion data will be compressed offline and stored somewhere accessible by the task and motion planning system 20 (e.g., memory 24 shown in FIG. 1). The compression process entails extracting the essential features of the motion data, thus allowing it to be stored more compactly. The stored motion data is used for real-time intersection evaluation to generate semantically-labeled motions. The net effect of the compressions will be a reduction of the total number of online operations required.

As used herein, the ratio of the space used in the original format relative to the compressed format will be referred to as the "compression factor." In a case where compression makes a big difference, the compression factor f will be larger of {n/(m+1), 1} where n is the number of hyper-cubicle cells and m is the number of candidate motions. In a case where there is no compression, the compression factor will be 1. This suggests that n should be much larger than m for the approach to provide any benefit in a particular application. Another observation is that for a fixed number of predicates p and candidate motions m, the compression factor will scale in proportion to the number of cells n. That is, f∈θ(n). Therefore, the resolution of the segmentation of the state space can be made arbitrarily high since the compression factor will increase in proportion to the resolution.

The intersection operation between motions and segmented regions of the state space can still be performed in the compressed format reducing the number of operations by a factor of f. However, this entails compressing the segmented state space online which requires n operations per predicate. With the modified intersection procedure the number of online operations becomes:

$$ops = p \cdot n + \frac{p \cdot m \cdot n}{2f} \qquad \text{Equation 2}$$

The advantage of this approach reveals itself if we consider a fixed number of predicates p and motions m while taking n towards infinity. Since f∈θ(n), there exists a constant c and sufficiently large N such that f(n)>c·n for every n>N. Thus, for n>N the number of operations are bounded by the following equation:

$$ops < p \cdot n + \frac{p \cdot m}{2c} \qquad \text{Equation 3}$$

While Equation 3 scales linearly with n as in equation 1, p, m, and n will each be large numbers in the context of autonomous driving so that the value of ops in Equation 3 will be substantially less than in Equation 1. The approach disclosed above may or may not work for all applications, as its effectiveness depends on the specific application and parameters under consideration.

Figure 5:
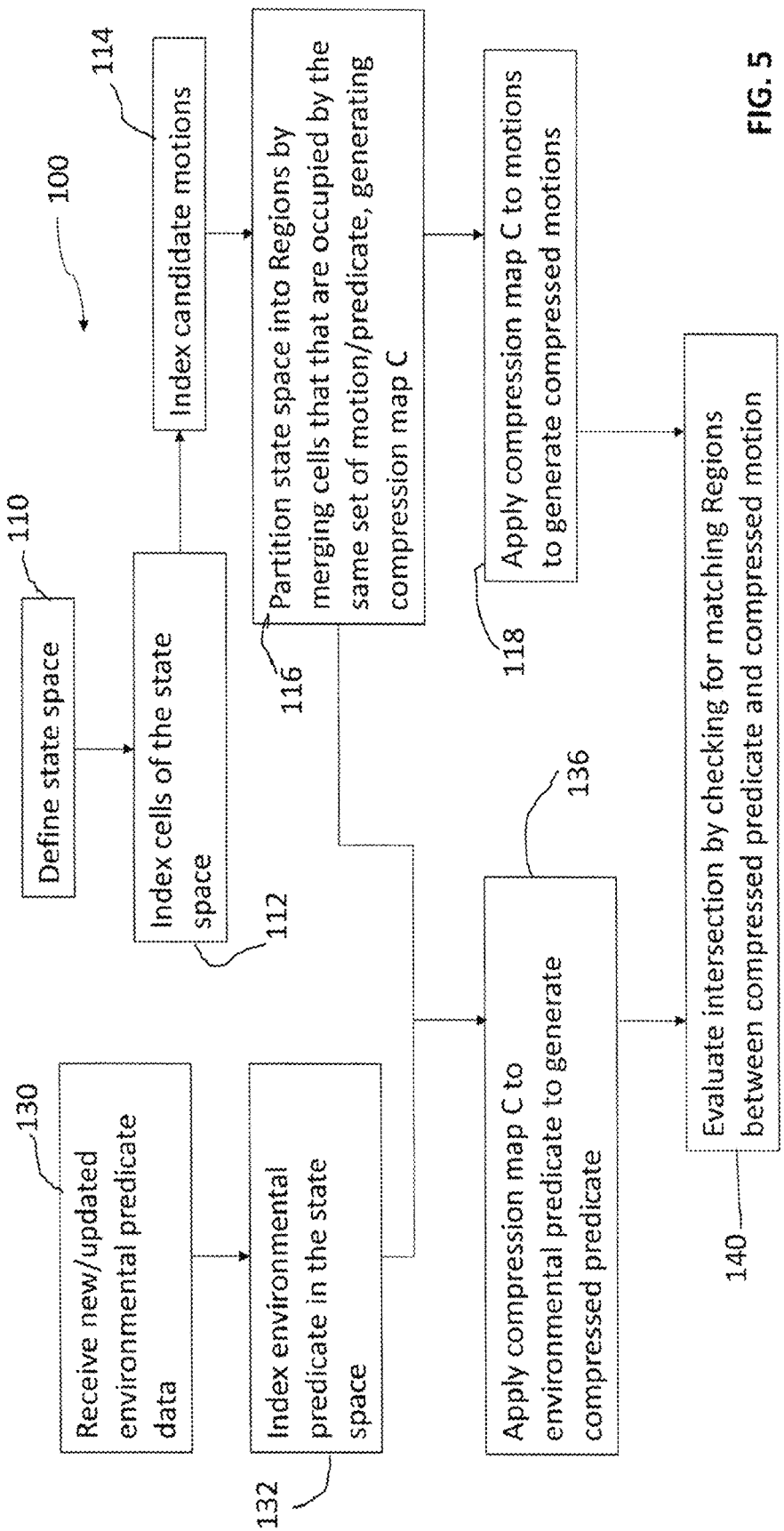
FIG. 5 depicts the state space compression process in accordance with one embodiment of the inventive concept.

FIG. 5 depicts the state space compression process 100 in accordance with one embodiment of the inventive concept. The process 100 begins with defining a state space (110) and approximating the state space by a finite number of indexed hyper-cubicle cells (112). Any suitable indexing system may be used, e.g. by a coordinate such as (x, y, t). Candidate motions are collected and indexed (114), and each candidate motion is denoted by Mi, which is the set of indices representing the ith motion. Each candidate motion is indexed in the state space, e.g. by the coordinate (x, y, t). The candidate motions are mapped onto the state space and partitioned into regions according to the procedure shown in FIG. 9 for determining if certain cells should be merged (116). Two cells that are occupied by the same set of predicate/motion may be merged into one Region (one "set"

can include zero, one, or multiple predicate/motions). The partitioning in step 116 results in a compression map C, which is then applied to the candidate motions (118). Where there is compression, application of the compression map C results in fewer regions than the number of cells, thus simplifying computations downstream.

The perception system 10 continually collects updated environmental predicate data (130). In real time, the environmental predicates are indexed using the indexing system of step 112 (132). The environmental predicate is mapped onto the state space, and the compression map that was generated in step 116 is applied to the environmental predicate (136), which may now expressed in terms of fewer regions than the number of cells. Using the compressed candidate motion and compressed environmental predicate, an intersection evaluation can be made (140).

The perception system 10 (shown in FIG. 1) updates the semantic labeling of the state space according to the predicates in the specification language. The updated information is mapped into the compressed state space using the compression map C. The labeled regions can then be intersected with the candidate motions in fewer operations than in the original state space simply because there are fewer states to examine when searching for intersection between the indices of a region describing a particular predicate and candidate motion.

Figure 8:
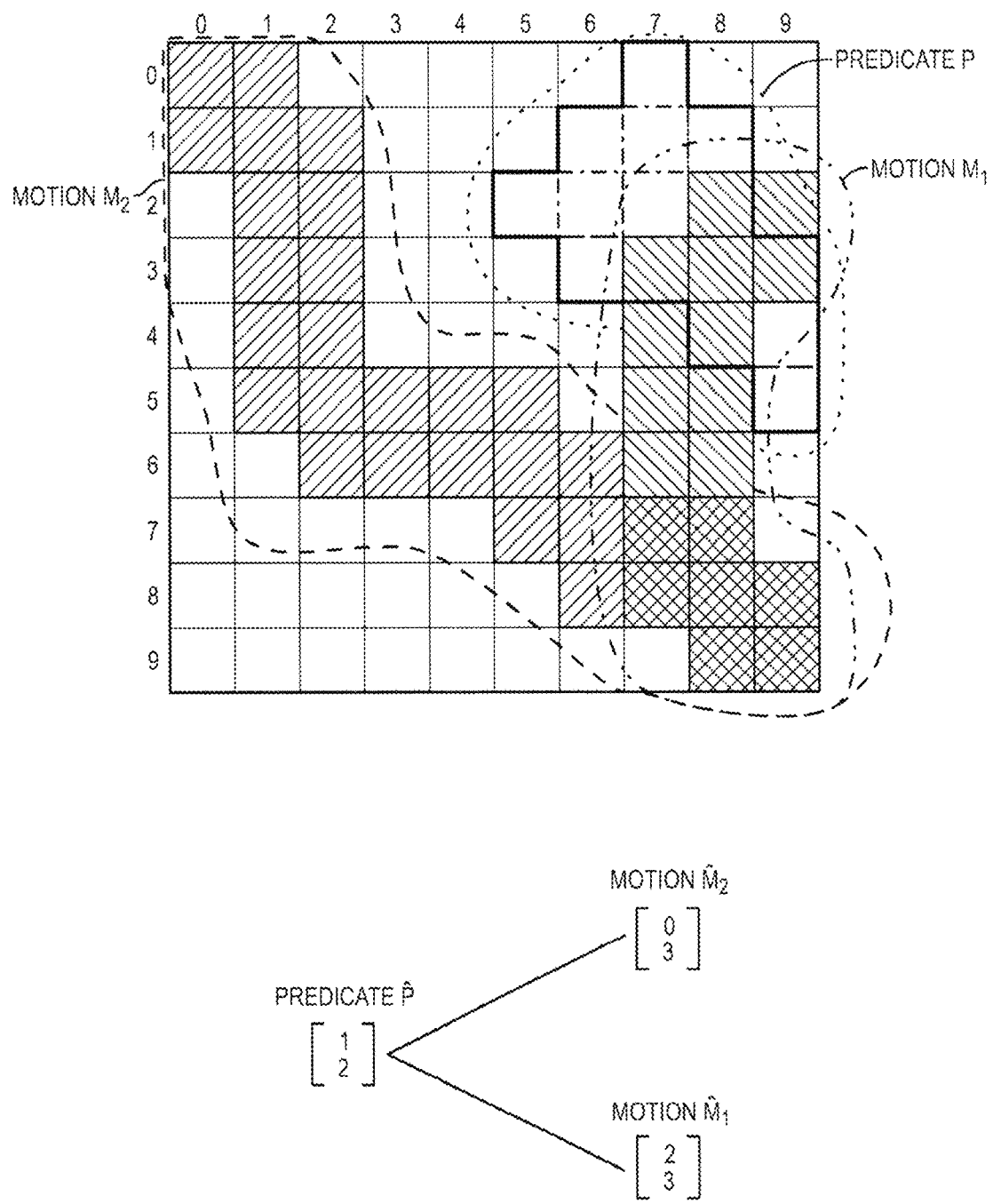
FIG. 8 illustrates how the intersection evaluation is conducted between compressed candidate motions and compressed predicate, in accordance with one embodiment.

FIG. 6, FIG. 7, and FIG. 8 illustrate the process 100 of FIG. 5. FIG. 6, which demonstrates the generation of compression map, depicts two candidate motions (Motion M1 and Motion M2) mapped onto a 100-cell state space that is indexed in two-dimensional coordinates (x, y). Based on the mapping of the two motions M1, M2, the state space is partitioned into four general Regions: Region 0 where only Motion M2 is mapped, Region 1 where neither Motion M1 nor Motion M2 is mapped, Region 2 where only Motion M1 is mapped, and Region 3 that is occupied by both Motion M1 and Motion M2. Region 0 is indicated by diagonal lines extending from upper right to lower left corners, Region 2 is indicated by diagonal lines extending from upper left to lower right corners, Region 3 is shown with cross-hatching, and Region 1 is shown as blank squares. A compression Map is generated that is useful for mapping the 100 cells to 4 Regions.

The output is effectively an array of integers C defining a mapping from an index in the approximated state space to an index in the compressed version of the approximated state space. For each motion, either the subset is contained within that motion or is disjointed from that motion. The jth element Cj contains the index in the compressed state space associated with the index j in the original state approximation to the state space. This compression procedure is outlined in FIG. 9. As shown in FIG. 9, if a (nominally non-singleton) subset of environment indices is either (i) a subset of a motion's indices or (ii) disjointed from a motion's indices, then that subset can be mapped to a single index in a compressed index set.

FIG. 7 illustrates how the compression map generated in FIG. 4 is applied to Motion M2. The area occupied by Motion M2 is originally indexed in (x, y) coordinates, as shown on the left side. When the compression map is applied to express the 100 cells in 4 Regions, the Compressed Motion M2 occupies Region 0 and Region 3, as shown on the right hand side. In this example, a state space approximated by 100 states is compressed to a state space with 4 states, giving a compression factor of 25. With the particular layout of motions M1 and M2, the compressed state space will have 4 states regardless of the initial number of cells in the approximation.

FIG. 8 illustrates how the intersection between Motion M1 and Predicate P is evaluated. As illustrated in FIG. 4B, the motions M1, M2 can be converted into the compressed representation offline and stored in a table. The Predicate P, which is typically an environmental item (e.g., a pedestrian, sidewalk, etc.) occupies the cells that are shown with bold outlines. The 100 cells are compressed down to 4 Regions using the compression map of FIG. 4, and the same compression map can be applied to the predicate P. The result is that the predicate and the motions are mapped to two indices each. More specifically applying the compression map, the Predicate P occupies Region 1 and Region 2. Motion M1 occupies Region 2 and the cross-hatched Region 3. Since both Predicate P and Motion M1 touch Region 2, there is an intersection. Motion M2, on the other hand, touches Region 0 and the cross-hatched Region 3, and thus does not intersect with the Predicate P.

The number of states in the compressed state space will have no more than the minimum of $\{n, 2^m\}$ states/regions (n is the number of states in the approximation and m is the number of candidate motions), causing the compression factor f to scale linearly with n for a fixed m if $n \gg 2^m$.

Example embodiments shown above use coordinates (x, y) as the original cell indexing method, and convert them to integers using the compression map C. An alternative indexing method utilizes a type of run length encoding (RLE) to represent the occupied space of a semantically labeled region instead of using the compression map C and the partitioning described above. As in the previous compression scheme, the key operation of determining set intersection can be computed directly on the compressed data format, making it memory-wise and computationally efficient. In the alternative method, run-length encoding is used to compress the representation of the motions in the environment being intersected.

Figure 10:
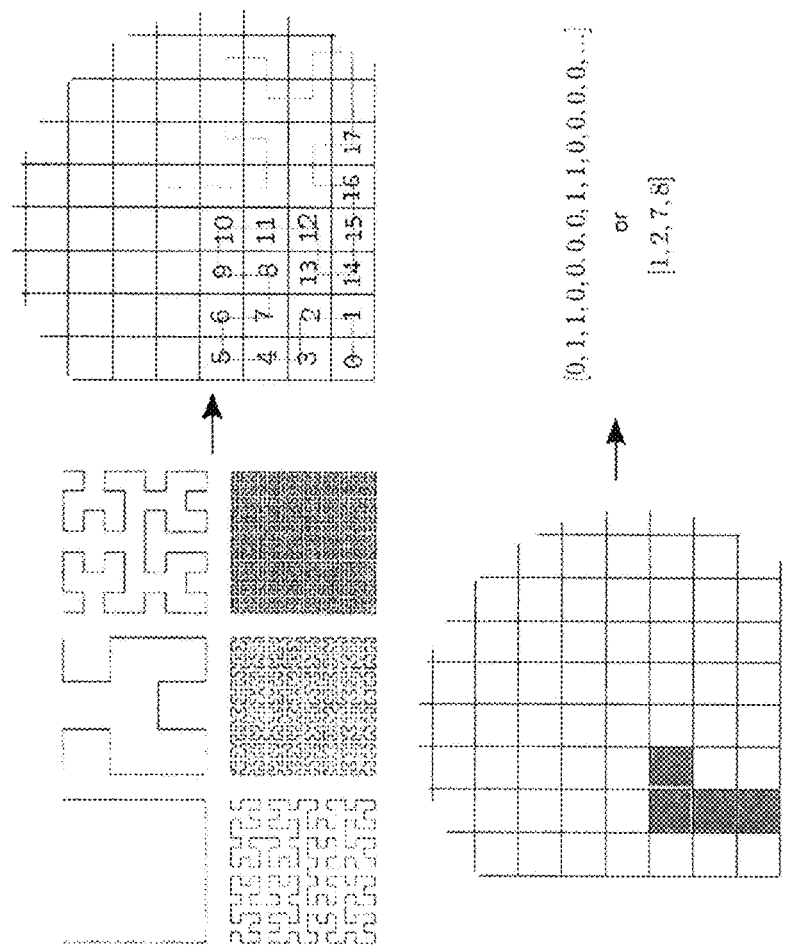
FIG. 10 demonstrates how a 2-dimensional Hilbert curve can be used to generate a binary vector, in accordance with one embodiment.

In one embodiment, Hilbert curves may be used for the indexing. FIG. 10 demonstrates how a 2-dimensional Hilbert curve can be used to generate a binary vector, indicating the occupied cells (shown as darkened squares) with value 1 and the unoccupied cells with value 0. Where there are two vectors, the two vectors have a nonempty intersection if, at some index of their associated binary vectors, both sets are assigned a value 1 at that index (the logical AND of the binary vectors is 1). This intersection can be found by exhaustively checking each index of the binary vectors, as shown in FIG. 11.

Figure 11:
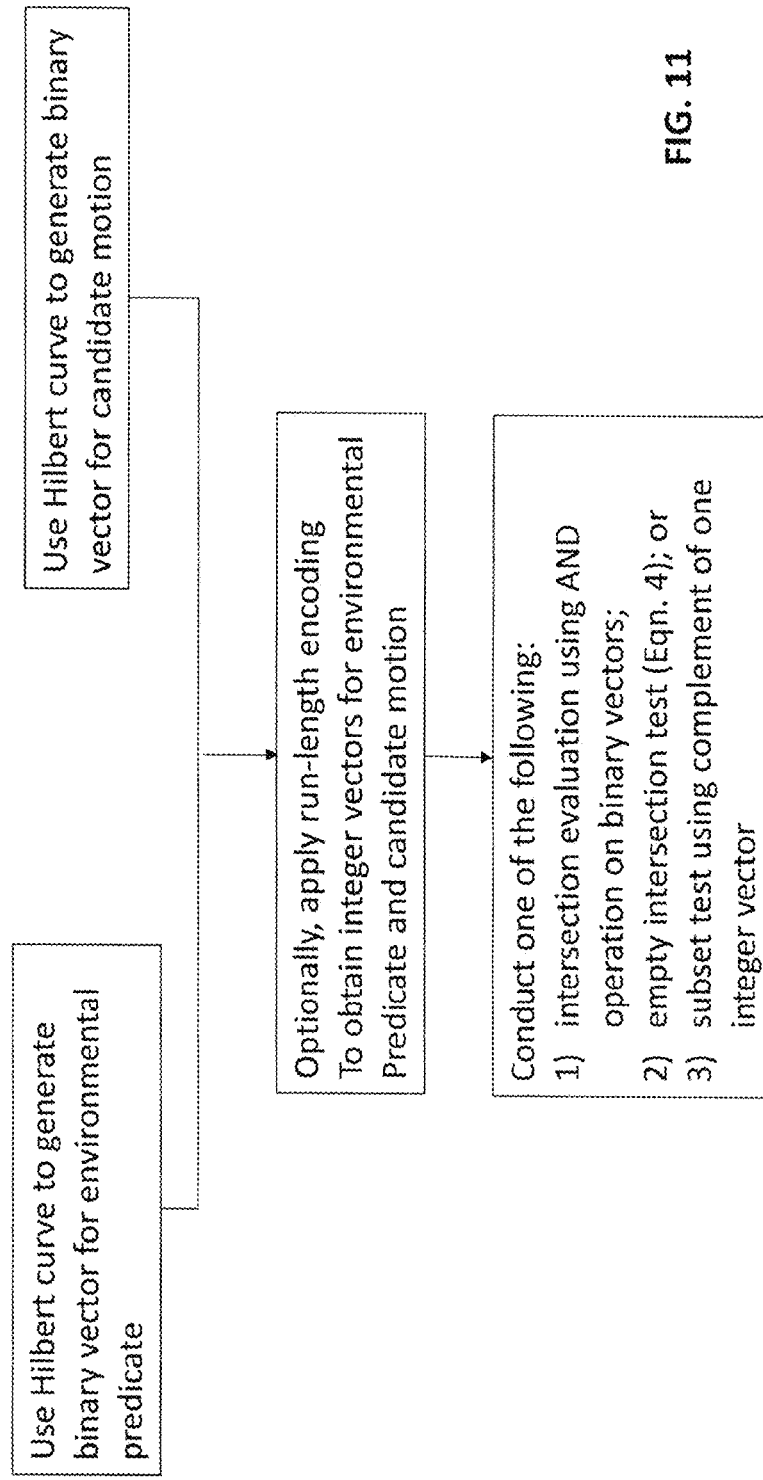
FIG. 11 is a flowchart summarizing how a Hilbert-curve-based indexing of a state space may be combined with a run-length-encoding-type compression, in accordance with one embodiment.

FIG. 11 also shows that as an alternative to comparing the binary vectors, the intersection can be evaluated using the RLE-like format. Supposing M and R are subsets of an n-Dimensional region in the RLE-like format, their intersection is empty if the following conditions are met:

$$M(2i+1) \leq R(2j) \text{ or } R(2j+1) \leq M(2i), \text{ for all } i,j \qquad \text{Equation 4}$$

Where i, j range to half the length of the corresponding integer vectors. In some cases, the RLE-like format will use less memory and Equation 8 can be evaluated in fewer operations than the logical AND operation between two binary vectors.

When there are a plurality of sequentially repeated values in a sequence of symbols (in this case, symbols are 0s and 1s), the data can be represented as a sequence of pairs representing the type of symbol followed by the number of times that the symbol is repeated. A binary vector is compressed to a vector of integers in the following three steps:

Step 1: The integer at the first index of the integer vector is the index of the first 1 in the binary vector.
Step 2: With the exception of the first integer in the integer vector, each integer represents an index of the binary vector where the value at that index is different from the preceding index in the string of 0s and 1s as read from left to right.
Step 3: If the value in the last entry of the binary vector is 1, then the last entry of the integer vector is the size of the binary vector.

An example of RLE-based compression of binary rector to integer vector using the three-step method above is the conversion of Equation 5 to Equation 6.

$$[1,1,1,1,1,1,1,1,0,0,0,0,0,0,0,1,1,0,0,0] \qquad \text{Equation 5}$$

$$[0,8,15,17] \qquad \text{Equation 6}$$

In the integer vector, the first value is 0 because the first "1" in the binary vector appears at index 0 (the $0^{th}$ position). There are eight is (indices 0-7 in the vector), and the first value that is different from the preceding index is when the value 0 appears in index 8. Hence, according to step 2, the second value of the integer vector is 8. After a series of 0s, the value switches to 1 in index 15, then back to 0 at index 17. Hence, continuing with step 2, "15" and "17" represent the next values in the integer vector. As the last entry in the binary vector is 0, there is no value recorded per step 3.

Conversely, the above 3-step method can be used to decompress an integer vector into a binary vector. An example is the decompression of Equation 7 to Equation 8.

$$[3,14,19,21] \qquad \text{Equation 7}$$

$$[0,0,0,1,1,1,1,1,1,1,1,1,1,1,0,0,0,0,0,1,1] \qquad \text{Equation 8}$$

Applying step 1 to Equation 6 indicates that the first place the value "1" appears in the binary vector is at index position 3 (the first index being 0). Then, applying step 2 indicates that position 14 is when there is a change in the index value from 1 to 0, and there is another change from 0 to 1 at index 19. Then, applying step 3, the last value shows that there are 21 values in the binary vector.

Instead of or in addition to evaluating whether two sets have a nonempty intersection, an evaluation may be done for whether one set is contained in another set. This subset evaluation allows several other set operations to be efficiently evaluated. For example, suppose L is a set that represents a nominal lane region. To verify that a vehicle remains in the desired lane, it would have to be checked whether the motion M is a subset of L. This determination can be converted to a set intersection problem on the complement of L, or $L^c$, namely verifying that there is no intersection between the motion M and the complement of L (area outside the desired lane). Making this determination involves generating the compressed format of L from $L^c$. This can be accomplished by one of the following ways:

1. If the current first element is non-zero, appending a zero to the first element of the integer vector and removing the last element.
2. If the first element is zero, removing a zero from the first element of the integer vector and appending an integer to the end of the vector equal to the length of the binary vector.

For example, the integer vector [0, 8, 15, 17] corresponds to the binary vector [1, 1, 1, 1, 1, 1, 1, 1, 0, 0, 0, 0, 0, 0, 0, 1, 1, 0, 0, 0]. The complement of the integer vector can be determined by the second of the two cases above since the first element is zero. Applying the second method, the complement becomes [8, 15, 17, 21]. The complement operation is efficient, and can be applied to the environment data.

Figure 12:
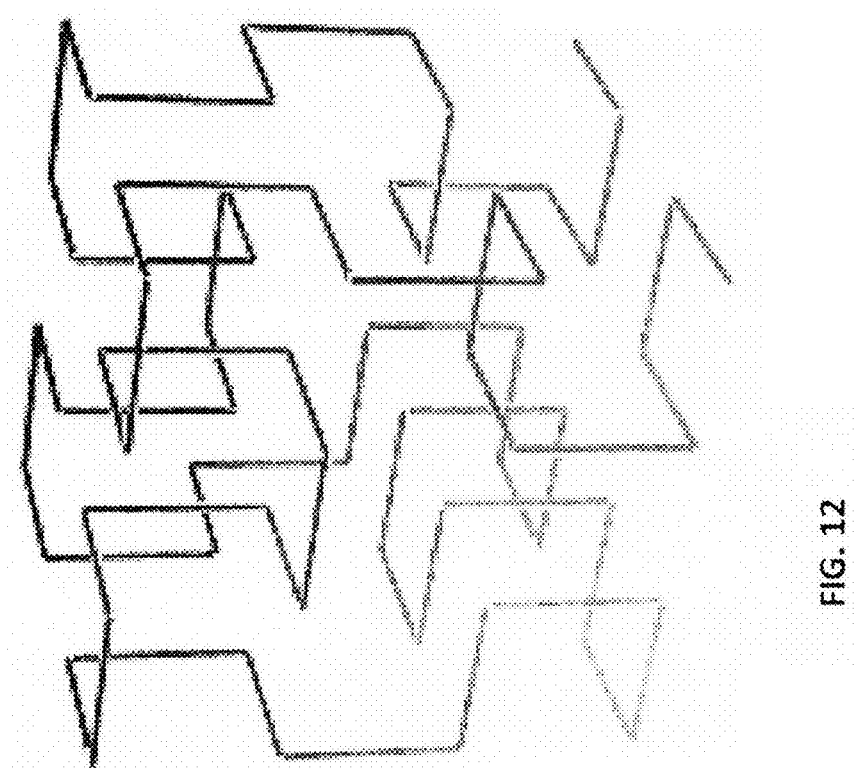
FIG. 12 depicts a three-dimensional variation of the Hilbert Curve.

Although the example in FIG. 10 depicts a 2-dimensional Hilbert curve, this is not a limitation of the concept disclosed herein. FIG. 12 depicts a three-dimensional variation of the Hilbert Curve, and analogous curves can be derived for arbitrary finite-dimensional spaces.

While the embodiments are described in terms of a method or technique, it should be understood that the disclosure may also cover an article of manufacture that includes a non-transitory computer readable medium on which computer-readable instructions for carrying out embodiments of the method are stored. The computer readable medium may include, for example, semiconductor, magnetic, opto-magnetic, optical, or other forms of computer readable medium for storing computer readable code. Further, the disclosure may also cover apparatuses for practicing embodiments of the inventive concept disclosed herein. Such apparatus may include circuits, dedicated and/or programmable, to carry out operations pertaining to embodiments.

Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to the embodiments.

While the inventive concept has been described with reference to exemplary embodiments, it will be apparent to those skilled in the art that various changes and modifications may be made without departing from the spirit and scope of the inventive concept.

What is claimed is:

1. A computer-implemented method of motion planning, comprising:
   generating a first set of indices that represent a predicate in a state space, wherein the state space comprises a predefined number of cells;
   accessing a library of candidate motions, wherein each of the candidate motions has a second set of indices that represent a trajectory in the state space;
   compressing the first set of indices to generate a first region in a compressed state space, the first region having a shape that is based on the first set of indices;
   compressing the second set of indices to generate a second region in the compressed state space, the second region having a shape that is based on the second set of indices; and
   determining whether each of the candidate motions intersects the predicate in the state space by determining whether there is an intersection between the first region and the second region in the compressed state space by comparing the compressed first set of indices with the compressed second set of indices.

2. The method of claim 1, wherein the compressing of the second set of indices is done offline, further comprising:
   storing the second region; and
   continually compressing the first set of indices to generate the first region based on input from sensors.

3. The method of claim 1, further comprising generating a compression map defining the state space as regions, there being fewer regions than cells, wherein the first set of indices and the second set of indices are mapped into the compressed state space using the generated compression map.

4. The method of claim 1, further comprising generating a third set of indices that represents cells in the state space that are not occupied by the predicate or the trajectory, and compressing the third set of indices to generate a third region.

5. The method of claim 4, further comprising generating a fourth set of indices that represents cells in the state space that are occupied by both the predicate and the trajectory, and compressing the fourth set of indices to venerate a fourth region such that the state space is expressed as first, second, third, and fourth regions in the compressed state space.

6. The method of claim 1, wherein the first set of indices is generated using a Hilbert curve in the state space, the first set of indices being a first binary vector.

7. The method of claim 6, wherein the second set of indices is a second binary vector, and determining whether there is the intersection depends on an evaluation of whether the same value appears in the same position in the first binary vector and the second binary vector.

8. The method of claim 6, wherein determining whether there is the intersection comprises evaluating whether one of the first and second set of indices in the compressed state space is contained in the other of the first and second set of indices in the compressed state space.

9. The method of claim 6, wherein the compressing comprises applying a run-length encoding technique to the first binary vector and the second binary vector, and wherein the first set of indices is a first integer vector, and the second set of indices is a second integer vector.

10. The method of claim 9, wherein determining whether there is the intersection comprises:
determining a complement of the second integer vector; and
evaluating whether the second integer vector occupies the same space in the state space as the complement of the first integer vector.

11. An autonomous agent, comprising:
a perception system including sensors for periodically collecting environmental data and a memory for storing map data;
a task and motion planning system including a memory for storing candidate motions and a processor for evaluating intersections between an environmental predicate and a plurality of candidate motions each candidate motion of the plurality of candidate motions being associated with one or more maneuvers executable by the autonomous agent, the processor configured to:
identify the plurality of candidate motions represented in a state space;
partition the state space based on intersections of the plurality of candidate motions;
generate a compression map based on the partitioning;
apply the compression map to the plurality of candidate motions to generate a plurality of compressed candidate motions;
identify an environmental predicate;
apply the compression map to the environmental predicate to generate a compressed environmental predicate;
determine whether the plurality of candidate motions intersect the environmental predicate by comparing the compressed plurality of candidate motions to the compressed environmental predicate; and
select one of the plurality of candidate motions based on whether the plurality of candidate motions intersect the environmental predicate; and
a decision-making system that executes a motion plan based on an output from the task and motion planning system.

12. The autonomous agent of claim 11, wherein the plurality of compressed candidate motions are generated offline.

13. The autonomous agent of claim 12 further comprising a memory storing the compression map, the compression map indicating a correlation between each cell in the state space and regions of the compressed state space.

14. The autonomous agent of claim 13, wherein the perception system continually collects updated environmental data, and the task and motion planning system updates the environmental predicate using the updated environmental data to evaluate whether there is an intersection between the environmental predicate and the candidate motion in real-time.

15. An autonomous agent, comprising:
a perception system including sensors for collecting environmental data and a memory for storing map data;
a task and motion planning system including a memory for storing candidate motions and a processor for evaluating intersection between an environmental predicate and a candidate motion by segmenting a state space into cells, indexing the environmental predicate and the candidate motion by using a Hilbert curve to generate a first binary vector representing the environmental predicate and a second binary vector representing the candidate motion, each candidate motion being associated with one or more maneuvers executable by the autonomous agent, applying run-length encoding to compress the first and second binary vectors, identifying an intersection between the environmental predicate and the candidate motion in the state space by comparing the compressed first and second binary vectors, and selecting a course of action based on the intersection between the compressed first and second binary vectors; and
a decision-making system that executes a motion plan based on an output from the task and motion planning system.

16. The autonomous agent of claim 15, wherein the task and motion planning system evaluates whether there is the intersection between the environmental predicate and the candidate motion by comparing the first binary vector to the second binary vector.

17. The autonomous agent of claim 15, wherein the task and motion planning system applies run-length encoding to the first binary vector to generate a first integer vector, and applies run-length encoding to the second binary vector to generate a second integer vector, and evaluates whether one of the first and second integer vectors is contained in the other one of the first and second integer vector.

18. The autonomous agent of claim 15, wherein the task and motion planning system applies run-length encoding to the first, binary vector to generate a first integer vector, and applies run-length encoding to the second binary vector to generate a second integer vector, and evaluates whether one of the first and second integer vectors is contained in a complement of the other one of the first and second integer vector.

19. The autonomous agent of claim 15, wherein the task and motion planning system applies run-length encoding to the second binary vector to generate a second integer vector, and stores the second integer vector to be evaluated for interaction with an updated environmental predicate.

* * * * *